United States Patent
Kasame

(10) Patent No.: US 9,965,959 B2
(45) Date of Patent: May 8, 2018

(54) LANE DEPARTURE WARNING APPARATUS

(71) Applicant: FUJITSU TEN LIMITED, Kobe-shi, Hyogo (JP)

(72) Inventor: Tomohide Kasame, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days. days.

(21) Appl. No.: 15/451,802

(22) Filed: Mar. 7, 2017

(65) Prior Publication Data

US 2017/0294129 A1 Oct. 12, 2017

(30) Foreign Application Priority Data

Apr. 11, 2016 (JP) ................... 2016-078895

(51) Int. Cl.
G08G 1/16 (2006.01)
(52) U.S. Cl.
CPC .................... G08G 1/167 (2013.01)
(58) Field of Classification Search
CPC ...................................... G08G 1/167
See application file for complete search history.

(56) References Cited

U.S. PATENT DOCUMENTS

2017/0262713 A1* 9/2017 Jiang .................. G06K 9/00798

FOREIGN PATENT DOCUMENTS

| JP | 2005242483 A | 9/2005 |
| JP | 2007265101 A | 10/2007 |
| JP | 2011203844 A | 10/2011 |
| JP | 2015005193 A | 1/2015 |
| JP | 2015069341 A | 4/2015 |
| JP | 2015096377 A | 5/2015 |

* cited by examiner

Primary Examiner — Leon Flores
(74) Attorney, Agent, or Firm — Oliff PLC

(57) ABSTRACT

A lane departure warning apparatus that issues a warning for a lane departure of a vehicle monitors a change amount of a location of the vehicle relative to a division line that defines a travelling lane, in a case where the lane departure warning apparatus has detected the lane departure of the vehicle from the travelling lane. The lane departure warning apparatus is issues the warning to an output device in at least one of cases in which (i) the change amount monitoring part determines that the change amount of the location of the vehicle is equal to or greater than a first threshold value and (ii) the change amount monitoring part determines that the change amount per a unit of time is equal to or greater than a second threshold value.

14 Claims, 8 Drawing Sheets

| ROAD TYPE | HIGHWAY | LOCAL STREET | | |
|---|---|---|---|---|
| NUMBER OF LANES | | 2 LANES OR GREATER ON ONE SIDE | 1 LANE ON ONE SIDE | |
| LANE WIDTH (m) | 3.50 | 3.25 | 3.00 | 2.75 |
| TRAVELLING SPEED (km/h) ⇩ THRESHOLD VALUE (cm) | SPEED < 80 ⇩ 1ST ±50  2ND ±45 | SPEED < 50 ⇩ 1ST ±40  2ND ±35 | SPEED < 40 ⇩ 1ST ±30  2ND ±25 | SPEED < 30 ⇩ 1ST ±20  2ND ±15 |
| TRAVELLING SPEED (km/h) ⇩ THRESHOLD VALUE (cm) | SPEED ≥ 80 ⇩ 1ST ±45  2ND ±40 | SPEED ≥ 50 ⇩ 1ST ±35  2ND ±30 | SPEED ≥ 40 ⇩ 1ST ±25  2ND ±20 | SPEED ≥ 30 ⇩ 1ST ±15  2ND ±10 |

FIG.4

LANE DEPARTURE WARNING APPARATUS

BACKGROUND OF THE INVENTION

Field of the Invention

The invention relates to a lane departure warning apparatus.

Description of the Background Art

Conventionally, there has been an apparatus that issues a warning in a case where the apparatus detects a departure of a host vehicle from a lane based on an image captured by a camera Counted on the host vehicle.

However, there is a case in which the warning is not necessary even when the host vehicle departs from the lane. For example, there is a case in which a driver intentionally drives the host vehicle to depart from the lane in order to avoid an obstacle existing on a side of a road. In this case, the issued warning may make passengers in the host vehicle unpleasant.

SUMMARY OF THE INVENTION

According to one aspect of the invention, a lane departure warning apparatus that issues a warning for a lane departure of a vehicle includes: a lane departure detector that detects the lane departure of the vehicle from a travelling lane; a change amount monitoring part that monitors a change amount of a location of the vehicle relative to a division line that defines the travelling lane, in a case where the lane departure has been detected by the land departure detector; and a warning part that issues the warning to an output device in at least one of cases in which (i) the change amount monitoring part determines that the change amount of the location of the vehicle is equal to or greater than a first threshold value and (ii) the change amount monitoring part determines that the change amount per a unit of time is equal to or greater than a second threshold value.

An issuing of an unnecessary warning for the lane departure can be controlled.

According to another aspect of the invention, the lane departure detector detects the lame departure to have occurred in a case where the vehicle crosses over the division line.

Since the lane departure warning apparatus does not issue the warning when the vehicle merely approaches the division line, an issuing of an unnecessary warning for the lane departure can be controlled.

Therefore, an object of the invention is to control an issuing of an unnecessary warning for the lane departure.

These and other objects, features, aspects and advantages of the invention will become more apparent from the following detailed description of the invention when taken in conjunction with the accompanying drawings.

BRIEF DESCRIPTION OF THE DRAWINGS

FIG. 4 illustrates an example of threshold in information of the embodiment;

DESCRIPTION OF THE EMBODIMENTS

With reference to the attached drawings, a lane departure warning apparatus and a lane departure warning method of this embodiment will be described below. The embodiment does not limit the invention of the application.

Figure 1:
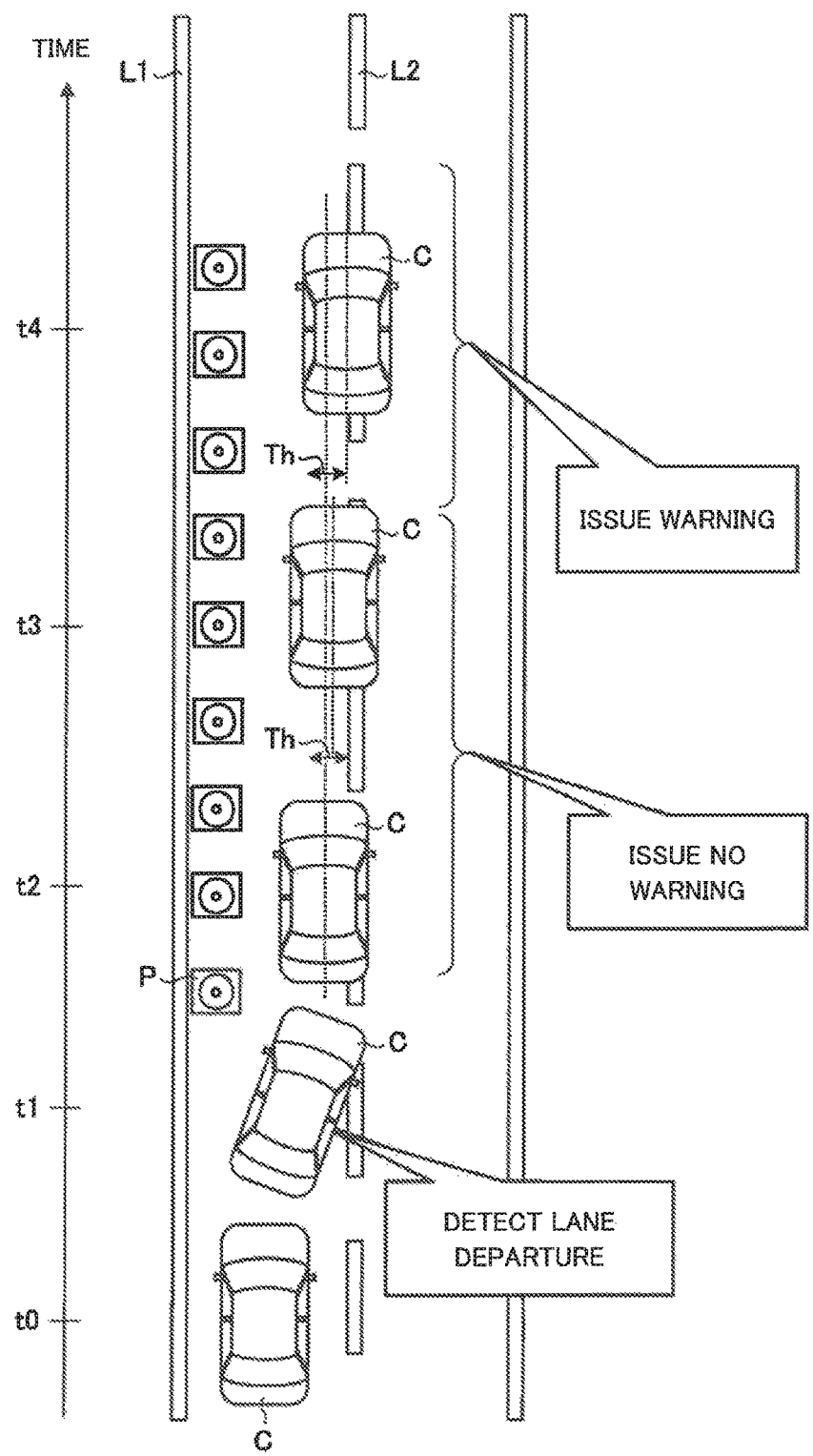
FIG. 1 illustrates a lane departure warning method performed by a lane departure warning apparatus of an embodiment.

FIG. 1 illustrates the lane departure warning method performed by the lane departure warning apparatus of the embodiment. As shown in FIG. 1, at a time point t0, a host vehicle C is travelling on a traffic lane that is defined by a lane division line L1 on a road shoulder side and by a lane division line L2, a center line, on a side of an oncoming lane. Then, the host vehicle C departs from a travelling lane. The lane departure warning method performed by the lane departure warning apparatus at that time will be described below. The lane division line L1 on the road shoulder side will be referred to as left division line L1, and the lane division line L2 on the side of the oncoming lane will be referred to as right division lane L2.

As shown in FIG. 1, for example, there is a case in which safe equipment, such as pylons P, is placed in the travelling lane of the host vehicle C along the left division line L1 for work on the side of the road.

In this case, if a driver drives the host vehicle C straightforward, the host vehicle C may come in contact with the pylons P. Thus, the driver performs a driving operation to avoid the pylons P. At that time, the host vehicle C may cross over the right division line L2 at a time point t1 to depart from the travelling lane.

Then, the lane departure warning apparatus detects a departure of the host vehicle C from the travelling lane at the time point t1 at which the host vehicle C crosses over the right division line L2. However, the lane departure warning apparatus does not issue a warning immediately after detecting the departure of the host vehicle C from the lane. Then the lane departure warning apparatus monitors a change amount of a location of the host vehicle C relative to the right division line L2.

Then, there is a case in which the host vehicle C travels over and along the right division line L2 from a time point t2, while avoiding the pylons P, and then moves in a direction of the right division line L2 by a very small distance at a time point t3.

A dotted line superimposed on the host vehicle C at the time point t2 in FIG. 1 shows a center line (a line passing through a center of a width of the host vehicle C) of the host vehicle C at the time point t2. Out of two dotted lines superimposed on the host vehicle C at the time point t3 in FIG. 1, a left dotted line shows the center line of the host vehicle C at the time point t2 and a right dotted line shows the center line of the host vehicle C at the time point t3.

In such a case, the lane departure warning apparatus compares the change amount of the location of the host vehicle C relative to the right division line L2 with a predetermined threshold value Th. The predetermined threshold value Th is a movable range of the host vehicle C in which the host vehicle C can move, without receiving any warning, in a horizontal direction from a previous center line of the host vehicle C that is a center line before the host vehicle C has moved in the horizontal direction.

Therefore, for example, in a case where the predetermined threshold, value Th is ±20 cm, the lane departure warning apparatus does not issue the warning even if the host vehicle C moves rightward less than 20 cm and leftward less than 20 cm from the previous center line of the host vehicle C after the host vehicle C has departed from the travelling lane.

In an example shown in FIG. 1, the lane departure warning apparatus compares a distance between the two dotted lines at the time point t3 with the predetermined threshold value Th. At the time point t3, the distance between the two dotted lines is smaller than the predetermined threshold value Th. Thus, the lane departure warning apparatus does not issue the warning in a time period from the time point t2 to the time point t3.

As described above, even if the host vehicle C has crossed over the right division line L2, while the change amount of the location of the host vehicle C relative to the right division line L2 after the host vehicle C has crossed over the right division line L2 is smaller than the predetermined threshold value Th, the lane departure warning apparatus does not issue the warning.

Thus, after the driver intentionally causes the host vehicle C to depart from the travelling lane, for example, to avoid an obstacle on the shoulder of the road, while the driver is properly handling a steering wheel to stably drive the host vehicle C without largely straying onto the oncoming lane, the lane departure warning apparatus does not issue an unnecessary warning.

On the other hand, the lane departure warning apparatus issues the warning in a case where the change amount of the location of the host vehicle C relative to the right division line L2 is equal to or greater than the predetermined threshold value Th after detecting the departure of the host vehicle C from the travelling lane: For example, there is a case in which the host vehicle C departs largely in the direction of the right division line L2 at a time point t4.

Out of two dotted lines superimposed on the host vehicle C at the time point t4 in FIG. 1, a left dotted line shows the center line of the host vehicle C at the time point t2, and a right dotted line shows the center line of the host vehicle C at the time point t4.

As shown in FIG. 1, a distance between the two dotted lines at the time point t4 reaches the predetermined threshold value Th. Thus, the lane departure warning apparatus issues the warning at the time point t4 when the change amount of the host vehicle C relative to the right division line L2 reaches the predetermined threshold value Th.

As described above, after the host vehicle C has crossed over the right division line L2, when the change amount of the location of the host vehicle C relative to the right division line L2 becomes equal to or greater than the predetermined threshold value Th, which means that the host vehicle C departs largely from the travelling lane, the lane departure warning apparatus issues the necessary warning.

After the host vehicle C has crossed over the right division line L2, in at least one of cases (i) in which the change amount of the location of the host vehicle C relative to the right division line L2 is equal to or greater than a first threshold value and (ii) in which the change amount per a unit of time is equal to or greater than a second threshold value, the lane departure warning apparatus issues the warning. The first threshold value and the second threshold value will be described later with reference to FIG. 4.

Figure 2:
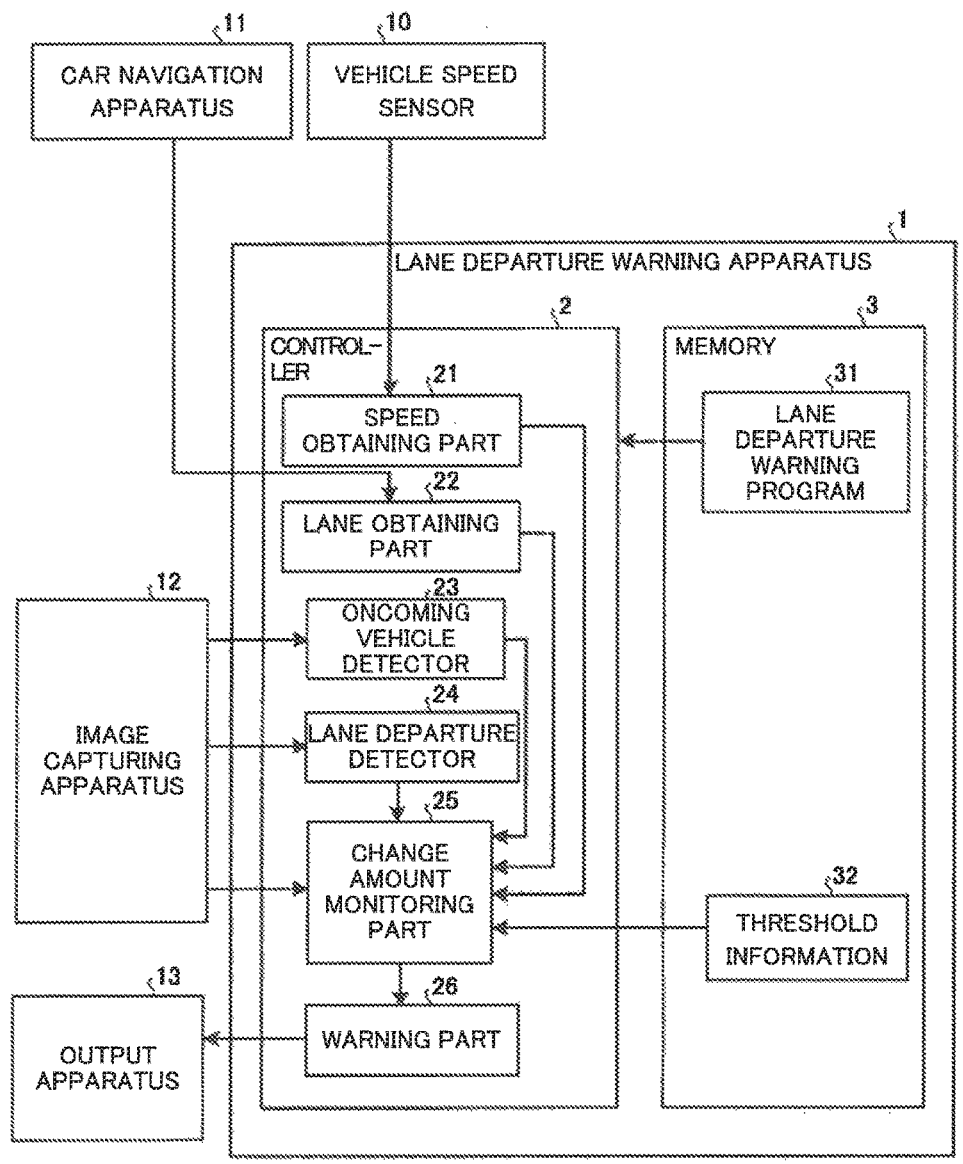
FIG. 2 is a functional block diagram showing a configuration of the lane departure warning apparatus of the embodiment.

Next, a configuration of a lane departure warning apparatus 1 of the embodiment will be described with reference to FIG. 2. FIG. 2 is a functional block diagram showing the configuration of the lane departure warning apparatus 1 of this embodiment. As shown in FIG. 2, the lane departure warning apparatus 1 is connected to a vehicle speed sensor 10, a car navigation apparatus 11, an image capturing apparatus 12 and an output apparatus 13.

The vehicle speed sensor 10 is a sensor that detects a travelling speed of the host vehicle C on which the lane departure warning apparatus 1 is mounted. The vehicle speed sensor 10 outputs a detected result of the travelling speed to the lane departure warning apparatus 1. The car navigation apparatus 11 stores map information, and provides a route guidance leading to an input destination from a current location of the host vehicle C, using the stored map information and the global positioning system (GPS). The car navigation apparatus 11 outputs, to the lane departure warning apparatus 1, information relating to a road (hereinafter referred to as "road information") on which the host vehicle C is travelling.

The image capturing apparatus 12 is a camera including an imaging device, such as charge coupled device (CCD) and complementary metal oxide semiconductor (CMOS). The image capturing apparatus 12 is provided to a location in which the image capturing apparatus 12 captures an image of a front area of the host vehicle C, for example, a front surface of a rearview mirror in a cabin of the host vehicle C. The image capturing apparatus 12 outputs the captured image to the lane departure warning apparatus 1.

The output apparatus 13 is, for example, a liquid crystal display provided to a location in which the driver can see the output apparatus 13. The output apparatus 13 displays the warning in a case where a signal for issuing the warning is input from the lane departure warning apparatus 1. The output apparatus 13 may be a warning lamp provided on an instrument panel or a sound output apparatus that outputs a warning sound or a warning voice.

The lane departure warning apparatus 1 includes a controller 2 and a memory 3. The memory 3 stores information, such as a lane departure warning program 31 and threshold information 32. The memory 3 is a memory device, for example, a random access memory (RAM), a semi-conductor memory device, such as a flash memory, a hard disk drive (HDD) or an optical disk.

The controller 2 includes, for example, a central processing unit (CPU), a read only memory (ROM), a random access memory (RAM), a microcomputer including an input port and an output port, and various circuits.

The controller 2 includes a speed obtaining part 21, a lane obtaining part 22, an oncoming vehicle detector 23, a lane departure detector 24, a change amount monitoring part 25 and a warning part 26. Functions of the speed obtaining part 21, the lane obtaining part 22, the oncoming vehicle detector 23, the lane departure detector 24, the change amount monitoring part 25 and the warning part 26 are implemented, for example, by reading out and executing the lane departure warning program 31 stored in the memory 3 by the CPU.

Each of the speed obtaining part 21, the lane obtaining part 22, the oncoming vehicle detector 23, the lane departure detector 24, the change amount monitoring part 25 and the warning part 26 may be partially or entirely configured with hardware, such as an application specific integrated circuit (ASIC) and a field programmable gate array (FPGA). The speed obtaining part 21, the lane obtaining part 22, the oncoming vehicle detector 23, the lane departure detector 24, the change amount monitoring part 25 and the warning part 26 will be concretely described below.

The speed obtaining part 21 is a processor that obtains the current travelling speed of the host vehicle C from the vehicle speed sensor 10, and then outputs the obtained travelling speed to the change amount monitoring part 25. The lane obtaining part 22 obtains, as the road information, a type of a travelling road (highway or local street), a speed limit and a number of lanes, including the current travelling lane, on one side of the travelling road, from the car navigation apparatus 11, and then outputs the road information to the change amount monitoring part 25.

The oncoming vehicle detector 23 is a processor that detects an oncoming vehicle travelling on the oncoming lane, based on the captured image input from the image capturing apparatus 12. In a case where the oncoming vehicle detector 23 has detected the oncoming vehicle, the oncoming vehicle detector 23 outputs, to the change amount monitoring part 25, information indicating that the oncoming vehicle has been detected.

Figure 3:
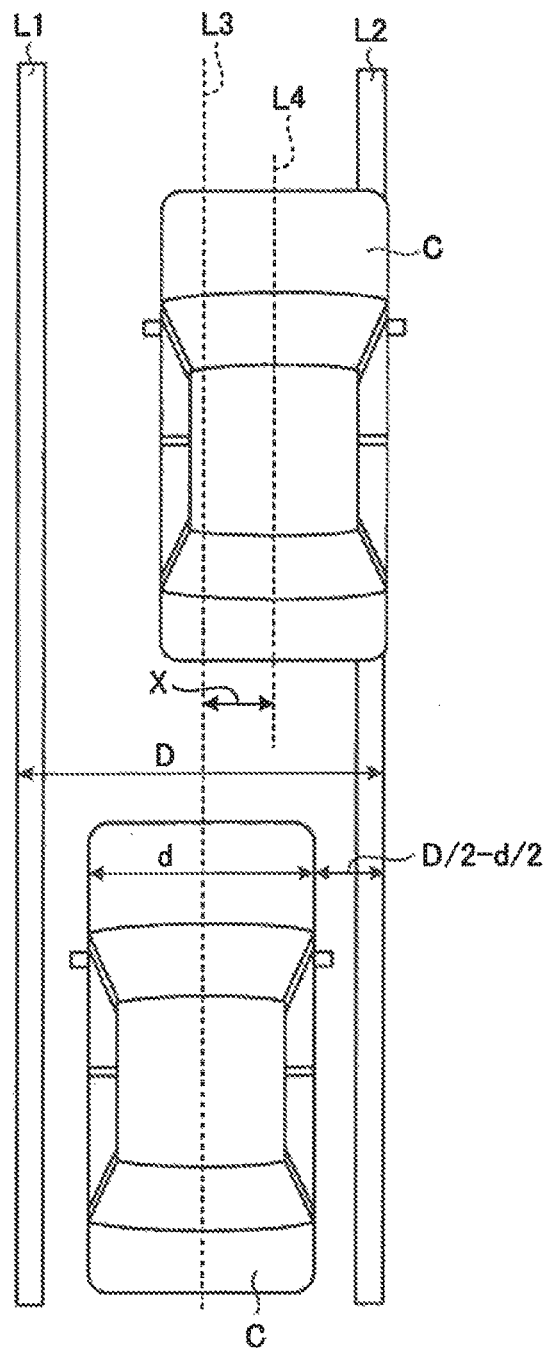
FIG. 3 illustrates an operation of a lane departure detector of the embodiment.

The lane departure detector 24 is a processor that detects the departure to have occurred of the host vehicle C from the travelling lane, based on the captured image input from the image capturing apparatus 12. Here, with reference to FIG. 3, an operation of the lane departure detector 24 will be explained. FIG. 3 illustrates the operation of the lane departure detector 24 of the embodiment.

As shown in FIG. 3, the lane departure detector 24 first extracts the left division line L1 and the right division line L2 from the captured image to identify (i) a width (lane width) D between the left division line L1 and the right division line L2, and (ii) a center line L3 between the left division line L1 and the right division line L2.

As shown in a lower drawing of FIG. 3, in a case where the host vehicle C is travelling in a center area of the travelling lane, the host vehicle C does not depart from the travelling lane if the host vehicle C moves leftward and rightward up to a distance obtained by subtracting a half of a width d of the host vehicle from a half of the lane width D, i.e. a distance (D/2−d/2).

Thus, the lane departure detector 24 identifies a location of a center line L4 of the host vehicle C in the travelling lane based on the captured image input from the image capturing apparatus 12 to calculate a distance X between the center line L4 of the host vehicle C and the center line L3 between the left division line L1 and the right division line L2. Next, in a case where the distance X is equal to or greater than the distance (D/2−d/2), the lane departure detector 24 detects the departure of the host vehicle C from the travelling lane.

Then, in the case where the lane departure detector 24 detects the departure of the host vehicle C from the travelling lane, the lane departure detector 24 outputs information indicative of the departure of the host vehicle C to the change amount monitoring part 25, and then serially outputs, to the change amount monitoring part 25, the information indicative of the location of the center line L4 of the host vehicle C in the travelling lane.

With reference back to FIG. 2, the change amount monitoring part 25 is a processor that monitors the change amount, input by the lane departure detector 24, of the location of the center line L4 of the host vehicle C in the travelling lane after receiving, from the lane departure detector 24, the information indicative of the departure of the host vehicle C from the travelling lane.

In a case where an obstacle exists on a left side of the travelling lane but no obstacle exists on a right side of the travelling lane, the change amount monitoring part 25 reads out the first threshold value and the second threshold value from the threshold information 32 stored in the memory 3 once the host vehicle C departs from the travelling lane. Then, the change amount monitoring part 25 compares the change amount of the center line L4 of the host vehicle C relative to the right division line L2 with the first threshold value and with the second threshold value.

In a case where an obstacle exists on the right side of the travelling lane but no obstacle exists on the left side of the travelling lane, the change amount monitoring part 25 compares the change amount of the center line L4 of the host vehicle C relative to the left division line L1 with the first threshold value and with the second threshold value.

The change amount monitoring part 25 compares, with the first threshold value, the change amount of the center line L4 of the host vehicle C relative to the right division line L2 or the left division line L1, and then in a case where the change amount of the center line L4 is equal to or greater than the first threshold value, the change amount monitoring part 25 outputs, to the warning part 26, information indicating that the change amount is equal to or greater than the first threshold.

The change amount monitoring part 25 compares, with the second threshold value, the change amount per a unit of time of the center line L4 of the host vehicle C relative to the right division line L2 or the left division line L1, and then in a case where the change amount of the center line L4 is equal to or greater than the second threshold value, the change amount monitoring part 25 outputs, to the warning part 26, information indicating that the change amount is equal to or greater than the second threshold. An example of an operation of the change amount monitoring part 25 will be described later with reference to FIG. 6 and FIG. 7.

Moreover, the change amount monitoring part 25 changes the first threshold value and the second threshold value according to a situation in which the host vehicle C is travelling, based on the travelling speed of the host vehicle C input from the speed obtaining part 21 and on the road information input from the lane obtaining part 22. Examples of the first threshold value and the second threshold value will be described later with reference to FIG. 4.

In a case where the change amount monitoring part 25 receives, from the oncoming vehicle detector 23, information indicating that an oncoming vehicle has been detected, the change amount monitoring part 25 stops monitoring the change amount of the center line L4 of the host vehicle C, and then outputs, to the warning part 26, information indicating that the oncoming vehicle has been detected.

In a case where the warning part 26 receives, from the change amount monitoring part 25, the information indicating that the change amount of the center line L4 of the host vehicle C is equal to or greater than the first threshold value, the warning part 26 causes the output apparatus 13 to output information indicating that the lane departure has occurred.

Moreover, in a case where the warning part 26 receives, from the change amount monitoring part 25, the information indicating that the change amount per the unit of time of the center line L4 of the host vehicle C is equal to or greater than the second threshold value, the warning part 26 causes the output apparatus 13 to output information indicating that the lane departure has occurred.

In a case where the warning part 26 receives, from the change amount monitoring part 25, the information indicating that the change amount monitoring part 25 has stopped monitoring the change amount of the center line L4, the warning part 26 causes the output apparatus 13 to output information indicating that the lane departure has occurred.

Next, with reference to FIG. 4, an example of the threshold information 32 of the embodiment will be described. FIG. 4 illustrates an example of the threshold information 32 of the embodiment. The memory 3 stores the threshold information 32, for example, the example shown in FIG. 4. More specifically, as shown in FIG. 4, the threshold into 32 includes the first threshold value and the second threshold value associated with each of the type of the road, the number of lanes, the lane width and the travelling speed.

For example, the first threshold value of ±50 cm and the second threshold value of ±45 cm are associated with a situation in which the host vehicle C travels in the lane having a width of 3.50 m on a highway below 80 km/h of the travelling speed. The first threshold value of ±45 cm and the second threshold value of ±40 cm are associated with a situation in Which the host vehicle C travels in the lane having a width of 3.50 m on a highway at 80 km/h or higher of the travelling speed.

The first threshold value of ±40 cm and the second threshold value of ±35 cm are associated with a situation in which the host vehicle C travels in a lane having a width of 3.25 m of a local street having two lanes or more on one side below 50 km/h of the travelling speed. Moreover, the first threshold value of ±35 cm and the second threshold value of ±30 cm are associated with a situation in which the host vehicle C travels in a lane having a width of 3.25 m on a local street having two lanes or more on one side at 50 km/h or higher of the travelling speed.

The first threshold value of ±30 cm and the second threshold value of ±25 cm are associated with a situation in which the host vehicle C travels in a lane having a width of 3.00 m of a local street having one lane on one side below 40 km/h of the travelling speed. Moreover, the first threshold value of ±25 cm and the second threshold value of ±20 cm are associated with a situation in which the host vehicle C travels in the lane having a width of 3.00 m of a local street having one lane on one side at 40 km/h or higher of the travelling speed.

The first threshold value of ±20 cm and the second threshold value of ±15 cm are associated with a situation in which the host vehicle C travels in a lane having a width of 2.75 m of a local street having one lane on one side below 30 km/h of the travelling speed. Moreover, the first threshold value of ±15 cm and the second threshold value of ±10 cm are associated with a situation in which the host vehicle C travels in the lane having a width of 2.75 m of a local street having one lane on one side at 30 km/h or higher of the travelling speed.

In the example shown in FIG. 4, each item of the type of the road, the number of lanes, the lane width and the travelling speed is roughly categorized and each item is associated with the first threshold value and the second threshold value. However, the items may be divided into more detailed categories.

As described above, as the number of lanes on one side of the road is greater, greater absolute values are set as the first threshold value and the second threshold value. As the number of lanes on one side of the road is smaller, smaller absolute values are set as the first threshold value and the second threshold value. Moreover, as the width of the lane is greater, greater absolute values are set as the first threshold value and the second threshold value. As the width of the lane is smaller, smaller absolute values are set as the first threshold value and the second threshold value.

Thus, in a case where risk is low even if the host vehicle C departs from the travelling lane to an extent because the number of lanes on one side of the road is great and the lane width is relatively wide, the lane departure warning apparatus 1 controls a frequent issuing f an unnecessary warning for the lane departure.

On the other hand, in a case where risk becomes high if the host vehicle C departs from the travelling lane to an extent because the number of lanes on one side of the road is small and the lane width is relatively narrow, the lane departure warning apparatus 1 issues highly necessary warning for the lane departure.

As the travelling speed of the host vehicle C is lower, greater absolute values are set as the first threshold value and the second threshold value. As the travelling speed of the host vehicle C is higher, smaller absolute values are set as the first threshold value and the second threshold value. Thus, in a case where risk is low even if the host vehicle C departs from the travelling lane to an extent because the travelling speed of the host vehicle C is relatively low the lane departure warning apparatus 1 controls the frequent issuing of the unnecessary warning for the lane departure.

On the other hand, in a case where risk becomes high if the host vehicle C departs from the travelling lane to an extent because the travelling speed of the host vehicle C is relatively high, the lane departure warning apparatus 1 issues highly necessary warning for the lane departure.

Moreover, for a same situation, an absolute value set as the first threshold value is greater than an absolute value set as the second threshold value. Thus, in a case where the center line L4 of the host vehicle C keeps moving in the unit of time, although each change amount of the center line L4 of the host vehicle C is relatively small within the second threshold value, when a sum of the change amounts becomes equal to or greater than the first threshold value, the lane departure warning apparatus 1 issues highly necessary warning for the lane departure.

Figure 5:
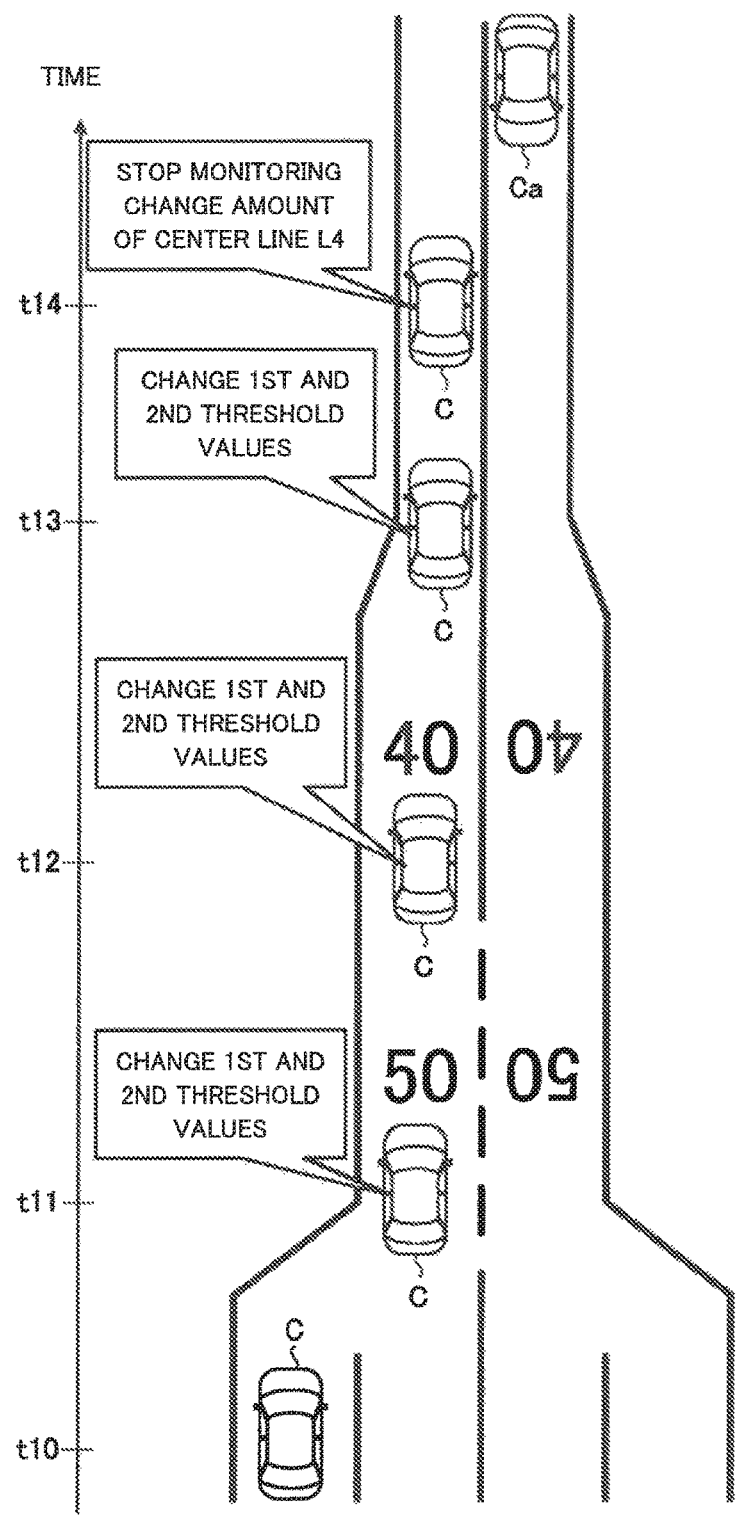
FIG. 5 illustrates an example of an operation of a controller of the embodiment.
Figure 6:
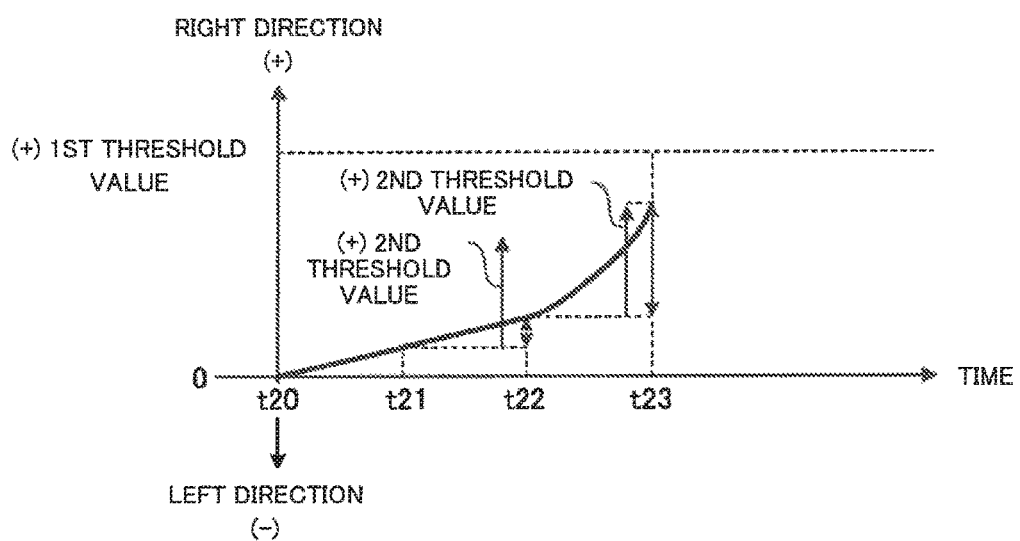
FIG. 6 illustrates an example of an operation of the controller of the embodiment.
Figure 7:
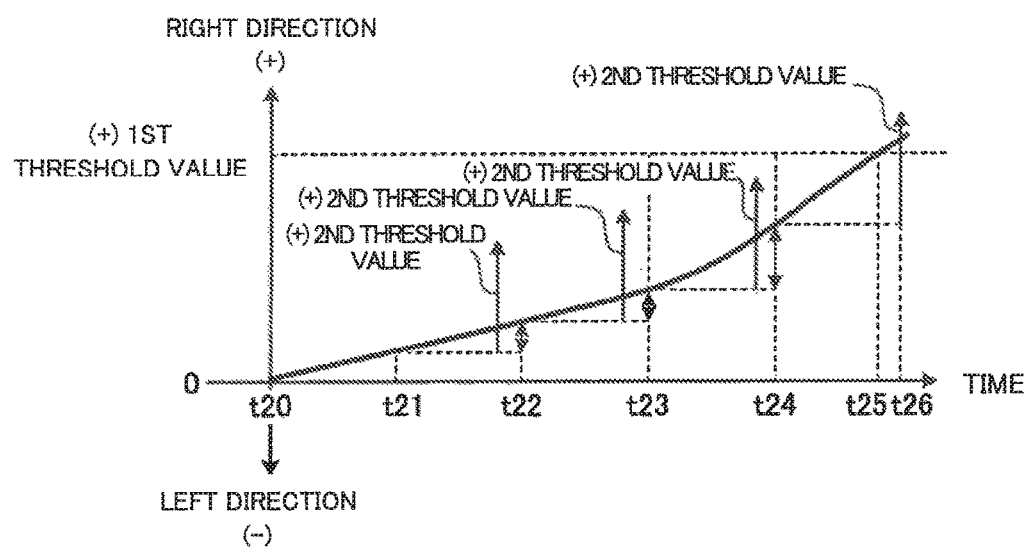
FIG. 7 illustrates an example of an operation of the controller of the embodiment.

Next, with reference to FIGS. 5-7, an example of an operation of the controller 2 in the embodiment will be described. FIGS. 5-7 illustrate the example of the operation of the controller 2 of the embodiment. FIG. 5 illustrates an example of situations in which the change amount monitoring part 25 (i) changes the first threshold value and the second threshold value, and (ii) stops monitoring the change amount of the center line L4. Moreover, each of FIG. 6 and FIG. 7 illustrates an example of a situation in which the warning part 26 issues the warning for the lane departure.

As shown in FIG. 5, for example, in a case where, at a time point t10, the host vehicle C is travelling in a lane having a width of 3.25 m of a local street having two lanes on one side at 50 km/h or greater, the change amount monitoring part 25 sets ±35 cm as the first threshold value and ±30 cm as the second threshold value (refer to FIG. 4).

Then, at a time point t11, when the host vehicle C enters a local street having one lane on one side having a width of 3.00 m and travels at 40 km/h or greater, the change amount monitoring part 25 sets ±25 cm as the first threshold value and ±20 cm as the second threshold value (refer to FIG. 4).

As described above, in a case where the number of lanes of the travelling road decreases, the change amount monitoring part 25 sets smaller absolute values as the first threshold value and the second threshold value. Thus, in a case where the departure of the host vehicle C from the travelling lane toward the oncoming lane leads to a greater risk, the lane departure warning apparatus 1 is more responsive to the risk to issue the warning.

Then, at a time point t12 at which the travelling speed of the host vehicle C becomes smaller than 40 km/h, the change amount monitoring part 25 sets ±30 cm as the first threshold value and ±25 cm as the second threshold value (refer to FIG. 4). As described above, even if the number of lanes is not changed, in a case where the travelling speed of the host vehicle C decreases, the change amount monitoring part 25 causes the absolute values as the first threshold value and the second threshold values to be greater.

Thus, even if the host vehicle C departs from the travelling lane toward the oncoming lane, in a case where it is easy, or the like, for the driver to return to the travelling lane by an operation of a steering wheel due to a lower travelling speed, the lane departure warning apparatus 1 controls the issuing of the unnecessary warning for the lane departure.

At a time point t13, when the host vehicle C enters a local street having a one lane on one side having a width of 2.75 m and travels at 30 km/h or greater, the change amount monitoring part 25 sets ±15 cm as the first threshold value and +10 cm as the second threshold value (refer to FIG. 4).

As described above, in a case where the host vehicle C travels in a lane having a smaller width, the change amount monitoring part 25 sets smaller absolute values as the first threshold value and the second threshold value. Thus, in a case where the departure of the host vehicle C from the travelling lane toward the oncoming lane leads to a greater risk, the lane departure warning apparatus 1 is more responsive to the risk to issue the warning.

However, even if the host vehicle C travels in the travelling lane having the smaller width, in a case where the travelling speed of the host vehicle C becomes lower, the change amount monitoring part 25 sets the greater absolute values as the first threshold value and the second threshold. Thus, even if the host vehicle C travels in the lane having the smaller width, in a case where the driver pays attention and reduces the travelling speed of the host vehicle C, the lane departure warning apparatus 1 controls the issuing of the unnecessary warning for the lane departure.

Then, in a case where an oncoming vehicle Ca is detected at a time point t14, the change amount monitoring part 25 stops monitoring the change amount of the center line L4. In this case, the warning part 26 (refer to FIG. 2) immediately issues the warning once the lane departure is detected by the lane departure detector 24.

While the oncoming vehicle is being detected, once the lane departure is detected by the lane departure detector 24, the warning part 26 immediately issues the warning regardless of the type of the road, the number of lanes, the lane width and the travelling speed of the host vehicle C. Thus, the lane departure warning apparatus 1 prevents the host vehicle C from coming in contact caused by the lane departure of the host vehicle C, with the oncoming vehicle.

Next, as shown in FIG. 6, for example, the host vehicle C starts moving rightward from a center of the travelling lane (positive side of a vertical axis of a graph in FIG. 6) at a time point t20. At a time point t21 at which the host vehicle C crosses over the right division line L2 (refer to FIG. 1), the lane departure detector 24 detects the lane departure of the host vehicle C.

Then, the change amount monitoring part 25 obtains the change amount of the center line L4 of the host vehicle C relative to the right division line L2 every predetermined time period (e.g. one sec.) from the time point t21. Here, in the predetermined time period from the time point t21 to a time point t22, the change amount of the center line L4 of the host vehicle C is smaller than the second threshold value on a positive side. Thus, the warning part 26 does not issue the warning at the time point t22.

Then, in the predetermine time period from the time point t22 to a time point t23, the change amount of the center line L4 of the host vehicle C reaches the second threshold value on the positive side. Therefore, the warning part 26 issues the warning at the time point t23.

As described above, even if the host vehicle C departs from the travelling lane, the warning part 26 does not issue the warning immediately. The warning part 26 does not issue the warning until the change amount of the center line L4 of the host vehicle C per the unit of time reaches the second threshold value. Thus, the lane departure Warning apparatus 1 controls the issuing of the unnecessary warning for the lane departure.

As shown in FIG. 7, for example, the host vehicle C starts moving rightward from the center of the travelling lane of the host vehicle C (positive side of a vertical axis of a graph in FIG. 7) at a time point t20. At a time point t21 at which the host vehicle C crosses over the right division line L2 (refer to FIG. 1), the lane departure detector 24 detects the lane departure of the host vehicle C.

The change amount monitoring part 25 obtains the change amount of the center line L4 of the host vehicle C relative to the right division line L2 every the predetermined time period from the time point t21. Time periods between two adjacent time points of the time point 121, a time point t22, a time point t23, a time point t24 and a time point t26 are the same.

Here, the change amount of the center line L4 of the host vehicle C in each time period between: the time points t21 and t22; the time points t22 and t23; the time points t23 and t24; and the time points t24 and t26 is smaller than the second threshold value on the positive side.

However, at a time point t25, the change amount of the center line L4 of the host vehicle C reaches the first threshold value on the positive side. Thus, the warning part 26 issues the warning at the time point t25. As described above, even if the change amount of the center line L4 per the unit of time does not reach the second threshold value, in a case where the sum of the change amounts of the center line L4 becomes equal to or greater than the first threshold value, the warning part 26 issues the warning.

Thus, while the lane departure warning apparatus 1 controls the issuing of the unnecessary warning for the lane departure of the host vehicle C, in a case where the host vehicle C departs from the travelling lane far enough to be possibly in danger, the lane departure warning apparatus 1 properly issues the warning.

Figure 8:
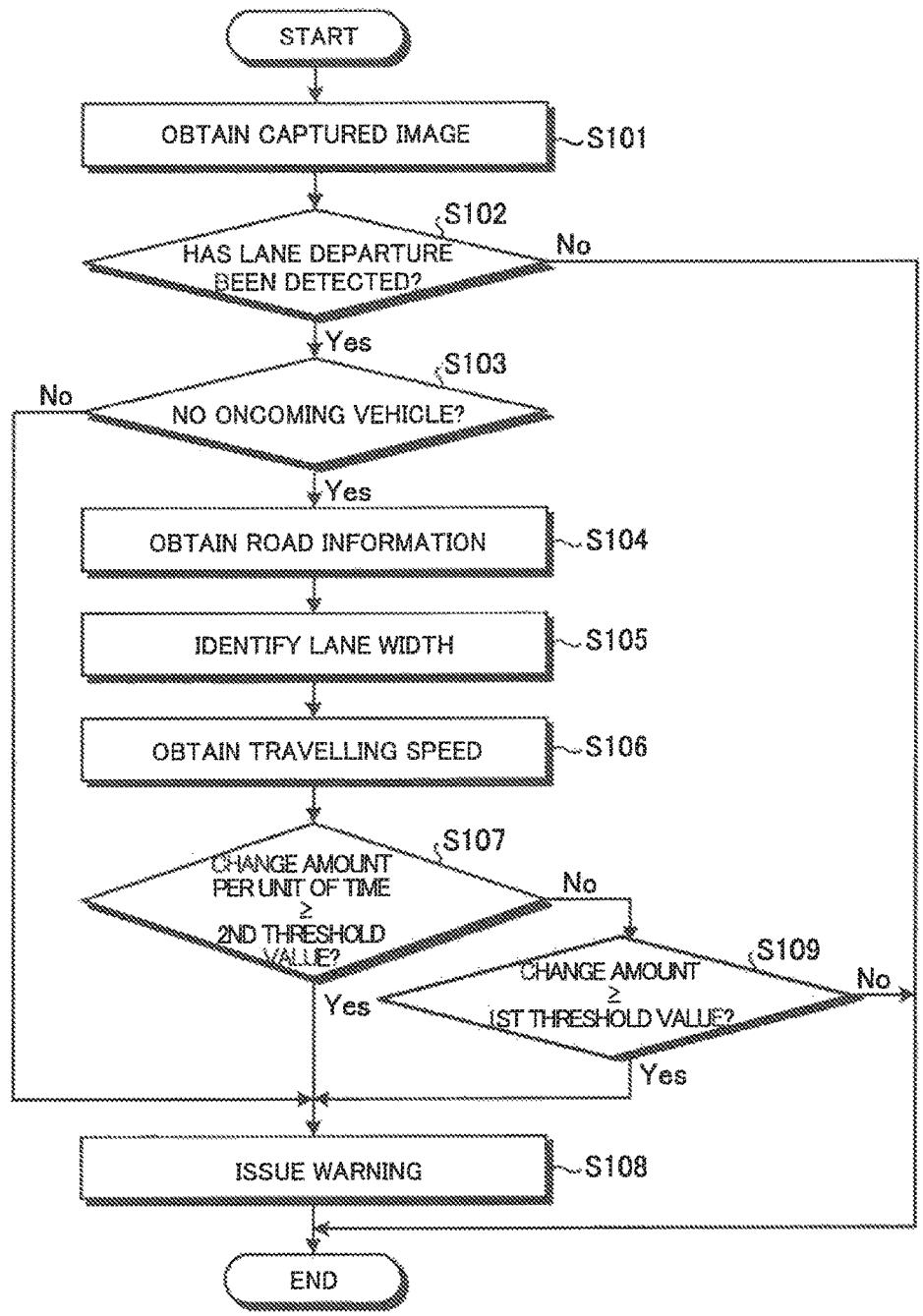
FIG. 8 is a flowchart illustrating a process performed by the controller of the embodiment.

Next, with reference to FIG. 8, a process performed by the controller f the embodiment will be described. FIG. 8 is a flowchart illustrating the process performed by the controller 2 of the embodiment. The controller 2 repeats the process shown in FIG. 8 in a predetermined time cycle (ex. a time cycle of some msec.) while the host vehicle C is travelling.

More specifically, as shown in FIG. 8, once the host vehicle C starts travelling, the controller 2 obtains the captured image from the image capturing apparatus 12 (a step S101). Then, the controller 2 determines, based on the captured image, whether or not the lane departure of the host vehicle C has been detected (a step S102).

Then, in a case where the controller 2 determines that no lane departure of the host vehicle C has been detected (No in the step S102), the controller 2 ends the process. On the other hand, in a case where the controller 2 determines that the lane departure of the host vehicle C has been detected (Yes in the step S102), the controller 2 determines whether or not no oncoming vehicle Ca exists (a step S103).

In a case where the controller 2 determines that the oncoming vehicle Ca exists (No in the step S103), the controller 2 moves the process to a step S108, and then issues the warning indicative of the lane departure of the host vehicle C. Then, the controller 2 ends the process. On the other hand, in a case where the controller 2 determines that no oncoming vehicle Ca exists (Yes in the step S103), the controller 2 obtains the road information from the car navigation apparatus 11 (a step S104).

Next, the controller 2 identifies, based on the capture image, the width of the travelling lane in which the host vehicle C is travelling step S105), and then obtains the travelling speed of the host vehicle C from the vehicle speed sensor 10 (a step S106). After that, the controller 2 determines whether or not the change amount of the center line L4 of the host vehicle C per the unit of time is equal to or greater than the second threshold value (a step S107).

In a case where the controller 2 determines that the change amount of the center line L4 of the host vehicle C per the unit of time is equal to or greater than the second threshold value (Yes in the step S107), the controller 2 moves the process to the step S108, and then issues the warning indicative of the lane departure of the host vehicle C. Then, the host vehicle C ends the process.

On the other hand, in a case where the controller 2 determines that the change amount of the center line L4 of the host vehicle C per the unit of time is smaller than the second threshold value (No in the step S107), the controller 2 determines whether or not the change amount of the center line LA of the host vehicle C is equal to or greater than the first threshold value (a step S109).

In a case where the controller 2 determines that the change amount of the center line L4 of the host vehicle C is equal to or greater than the first threshold value (Yes in the step S109), the controller 2 moves the process to the step S108, and then issues the warning indicative of the lane departure of the host vehicle C. Then, the controller 2 ends the process. On the other hand, in a case where the controller 2 determines that the change amount of the center line L4 of the host vehicle C is smaller than the first threshold value (No in the step S109), the controller 2 ends the process.

As described above, the lane departure warning apparatus of the embodiment includes the lane departure detector, the change amount monitoring part and the warning part. The lane departure detector detects the departure of the host vehicle from the travelling lane. In the case where the departure of the host vehicle has been detected by the lane departure detector, the change amount monitoring part monitors the change amount of the position of the host vehicle relative the division line of the travelling lane of the host vehicle.

In at least one of cases (i) in which the change amount monitoring part determines that the change amount of the host vehicle is equal to or greater than the first threshold value and (ii) in which the change amount of the host vehicle per the unit of time is equal to or greater than the second threshold value, the warning part issues the warning. Thus, the lane departure warning apparatus controls the issuing of the unnecessary warning for the lane departure.

In a case where the host vehicle strays from the division line, the lane departure detector detects the departure of the host vehicle. Thus, since the lane departure warning apparatus does not issue the warning because the host vehicle merely approaches the division line, the lane departure warning apparatus 1 controls the issuing of the unnecessary warning for the lane departure.

The lane departure detector detects the departure of the host vehicle based on the center line of the travelling lane, the center line of the host vehicle, the width of the travelling lane and the width of the host vehicle. Thus, the lane departure warning apparatus detects the lane departure of the host vehicle by performing the relatively simple process.

The change amount monitoring part changes the first threshold values and the second threshold value according to the travelling speed of the host vehicle. Thus, the lane departure warning apparatus properly issues the warning for the lane departure of the host vehicle according to the travelling speed of the host vehicle.

The change amount monitoring part changes the first threshold values and the second threshold value according to the width of the travelling lane. Thus, the lane departure warning apparatus properly issues the warning for the lane departure of the host vehicle according to the width of the travelling lane.

The change amount monitoring part changes the first threshold values and the second threshold value according to the number of lanes on a side of the road that includes the travelling lane. Thus, the lane departure warning apparatus properly issues the warning for the lane departure of the host vehicle according to the number of lanes on the side of the road that includes the travelling lane.

In the case where the oncoming vehicle exists, if the departure of the host vehicle is detected by the lane departure detector, the warning part issues the warning. Thus, the lane departure warning apparatus prevents the host vehicle from coming in contact caused by the lane departure of the host vehicle, with the oncoming vehicle.

More effects and modifications of the embodiment can be easily derived by a person skilled in the art. Thus, broader modes of the invention are not limited by the specific details and the representative embodiment described above. Therefore, various modifications are possible without departing from the comprehensive concept and spirit of the invention defined in the attached claims and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A lane departure warning apparatus that issues a warning for a lane departure of a vehicle, the lane departure warning apparatus comprising:
    a lane departure detector that detects the lane departure of the vehicle from a travelling lane;
    a change amount monitoring part that monitors a change amount of a location of the vehicle relative to a division line that defines the travelling lane, in a case where the lane departure has been detected by the land departure detector; and
    a warning part that issues the warning to an output device in at least one of cases in which (i) the change amount monitoring part determines that the change amount of the location of the vehicle is equal to or greater than a first threshold value and (ii) the change amount monitoring part determines that the change amount per a unit of time is equal to or greater than a second threshold value, wherein the warning part does not issue the warning, even though the vehicle continues to be departed from the travelling lane, (1) when the change amount monitoring part determines that the change amount of the location of the vehicle is less than the first threshold value or (2) when the change amount monitoring part determines that the change amount per a unit of time is less than the second threshold value.

2. The lane departure warning apparatus according to claim 1, wherein the lane departure detector detects the lane departure to have occurred in a case where the vehicle crosses over the division line.

3. The lane departure warning apparatus according to claim 2, wherein
the lane departure detector detects that the vehicle crosses over the division line based on a distance between a center line of the travelling lane and a center line of the vehicle, a width of the travelling lane, and a width of the vehicle.

4. The lane departure warning apparatus according to claim 1, wherein
the change amount monitoring part changes the first threshold value and the second threshold value according to a travelling speed of the vehicle.

5. The lane departure warning apparatus according to claim 1, wherein
the change amount monitoring part changes the first threshold value and the second threshold value according to a width of the travelling lane.

6. The lane departure warning apparatus according to claim 1, wherein
the change amount monitoring part changes the first threshold value and the second threshold value according to a number of lanes on a side of a travelling road that includes the travelling lane.

7. The lane departure warning apparatus according to claim 1, wherein
the warning part issues the warning to the output device in a case where the lane departure has been detected by the lane departure detector while an oncoming vehicle exists.

8. A lane departure warning method that is executed by a computer, the lane departure warning method comprising the steps of:
(a) detecting a lane departure of a vehicle from a travelling lane;
(b) monitoring a change amount of a location of the vehicle relative to a division line that defines the travelling lane, in a case where the lane departure has been detected by the step (a); and
(c) issuing a warning in at least one of cases in which (i) the step (b) determines that the change amount of the location of the vehicle is equal to or greater than a first threshold value and (ii) the step (b) determines that the change amount per a unit of time is equal to or greater than a second threshold value, wherein the warning is not issued, even though the vehicle continues to be departed from the travelling lane, (1) when the step (b) determines that the change amount of the location of the vehicle is less than the first threshold value or (2) when the step (b) determines that the change amount per a unit of time is less than the second threshold value.

9. The lane departure warning method according to claim 8, wherein
the step (a) detects the lane departure to have occurred in a case where the vehicle crosses over the division line.

10. The lane departure warning method according to claim 9, wherein
the step (a) detects that the vehicle crosses over the division line based on a distance between a center line of the travelling lane and a center line of the vehicle, a width of the travelling lane, and a width of the vehicle.

11. The lane departure warning method according to claim 8, wherein
the step (b) changes the first threshold value and the second threshold value according to a travelling speed of the vehicle.

12. The lane departure warning method according to claim 8, wherein
the step (b) changes the first threshold value and the second threshold value according to a width of the travelling lane.

13. The lane departure warning method according to claim 8, wherein
the step (b) changes the first threshold value and the second threshold value according to a number of lanes on a side of a travelling road that includes the travelling lane.

14. The lane departure warning method according to claim 8, wherein
the step (c) issues the warning in a case where the lane departure has been detected by the step (a) while an oncoming vehicle exists.

* * * * *